United States Patent
Zhu et al.

(10) Patent No.: US 11,395,155 B2
(45) Date of Patent: Jul. 19, 2022

(54) VIRTUAL SERVING BEAM TRACKING IN MILLIMETER WAVE WIRELESS SYSTEMS

(71) Applicant: QUALCOMM incorporated, San Diego, CA (US)

(72) Inventors: Jun Zhu, San Diego, CA (US); Yong Li, San Diego, CA (US); Hongbo Yan, Vista, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 16/918,475

(22) Filed: Jul. 1, 2020

(65) Prior Publication Data

US 2021/0006986 A1 Jan. 7, 2021

Related U.S. Application Data

(60) Provisional application No. 62/870,981, filed on Jul. 5, 2019.

(51) Int. Cl.
*H04W 16/28* (2009.01)
*H04W 24/10* (2009.01)
(Continued)

(52) U.S. Cl.
CPC .......... *H04W 16/28* (2013.01); *H04B 17/318* (2015.01); *H04B 17/336* (2015.01);
(Continued)

(58) Field of Classification Search
CPC ... H04W 16/28; H04W 24/10; H04W 56/001; H04W 72/005; H04W 72/046; H04B 17/318; H04B 17/336
See application file for complete search history.

(56) References Cited

U.S. PATENT DOCUMENTS 9,900,891 B1 2/2018 Islam et al.
11,169,259 B2 * 11/2021 Reiher ................. G05D 1/0257
(Continued)

FOREIGN PATENT DOCUMENTS

EP        3618297 A1 *  3/2020  .......... H04B 7/0456
WO   WO-2018203679 A1 * 11/2018  ............ H04B 17/24

OTHER PUBLICATIONS

Huawei, et al., "Beam Management Enhancements for Latency and Overhead Reduction", 3GPP Draft, 3GPP TSG RAN WG1 Meeting #94bis, R1-1810105, 3rd Generation Partnership Project (3GPP), Mobile Competence Centre, 650, Route Des Lucioles, F-96921 Sophia-Antipolis Cedex, France, vol. RAN WG1, No. Chengdu, China, Oct. 8-12, 2018, Sep. 29, 2018 (Sep. 29, 2018), XP051517520, 5 Pages, Retrieved from the Internet: URL: http://www.3gpp.org/ftp/tsg%5Fran/WG1%5FRL1/TSGR1 %5F94b/Docs/R1% 2D1810105%2Ezip [retrieved on Sep. 29, 2018], the whole document.

(Continued)

*Primary Examiner* — Deepa Belur
(74) *Attorney, Agent, or Firm* — Holland & Hart LLP

(57) ABSTRACT

Methods, systems, and devices for wireless communications at a user equipment (UE) are described. Aspects of the described techniques may include the user equipment measuring signal aspects for a plurality of respective receive beams for receiving communications associated with a synchronization signal block transmitted by a base station on a transmit beam. From the measured signal aspects, the UE may determine that a receive beam from the plurality of receive beams is a preferred beam for receipt of communications from the base station transmitted on the transmit beam. With the determined preferred beam, the UE may initiate a beam-sweeping procedure to re-measure the plurality of UE receive beams, where the UE measures the first (Continued)

UE receive beam before measuring others of the plurality of UE receive beams.

30 Claims, 11 Drawing Sheets

(51) Int. Cl.
    *H04W 56/00*     (2009.01)
    *H04W 72/00*     (2009.01)
    *H04B 17/318*     (2015.01)
    *H04B 17/336*     (2015.01)
    *H04W 72/04*     (2009.01)

(52) U.S. Cl.
    CPC ......... *H04W 24/10* (2013.01); *H04W 56/001* (2013.01); *H04W 72/005* (2013.01); *H04W 72/046* (2013.01)

(56) References Cited

U.S. PATENT DOCUMENTS

| | | |
|---|---|---|
| 2016/0021548 A1 | 1/2016 | Raghavan et al. |
| 2019/0082331 A1 | 3/2019 | Raghavan et al. |
| 2019/0132040 A1 | 5/2019 | Bai et al. |
| 2020/0228180 A1* | 7/2020 | Zhang .................. H04L 5/0023 |
| 2021/0226689 A1* | 7/2021 | Farag .................... H04B 7/088 |
| 2021/0243567 A1* | 8/2021 | Takano ................ H04W 16/28 |

OTHER PUBLICATIONS

International Search Report and Written Opinion—PCT/US2020/040656—ISAEPO—dated Oct. 2, 2020.

* cited by examiner

VIRTUAL SERVING BEAM TRACKING IN MILLIMETER WAVE WIRELESS SYSTEMS

CROSS REFERENCE

The present Application for Patent claims the benefit of U.S. Provisional Patent Application No. 62/870,981 by ZHU et al., entitled "VIRTUAL SERVING BEAM TRACKING IN MILLIMETER WAVE WIRELESS SYSTEMS," filed Jul. 5, 2019, assigned to the assignee hereof, and expressly incorporated by reference herein.

FIELD OF TECHNOLOGY

The following relates generally to wireless communications at a user equipment (UE) and more specifically to virtual serving beam tracking in millimeter wave wireless systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In a millimeter wave communications system, a UE searches for and measures transmit and receive beams in a time-varying wireless channel. For a particular transmit beam, a base station may transmit one or more signals in each of several synchronization signal blocks (SSB) in order to transmit critical system parameters. In some instances, the different SSBs may correspond to different transmit beams. The UE may receive and decode the one or more signals of a SSB so the UE may determine time and frequency parameters that are useful for communicating with the base station. For example, the determined time and frequency parameters may allow the UE to demodulate downlink messages from the base station and to transmit uplink signals to the base station with the correct timing. Also, a UE may determine one or more channel measurement parameters from the SSB. A beam scheduler of the UE may decide which receive beam that the UE may use to measure the channel at each measurement interval, and then determine which receive beams are the best beam candidates corresponding to a particular SSB at that time period. In making this determination (e.g., a determination of a virtual serving beam), the UE may sweep over all viable receive beams in order to find the best beam to utilize at that time. The beam sweeping method used by the UE may affect the efficiency of the UE in establishing an optimal transmit/receive beam pair.

SUMMARY

The described techniques relate to improved methods, systems, devices, and apparatuses that support virtual serving beam tracking in millimeter wave wireless systems. Generally, the described techniques provide for techniques that ensure or otherwise improve wireless communications between a user equipment and a base station within a wireless network. Broadly, aspects of the described techniques may include the user equipment measuring signal aspects for a plurality of respective receive beams for receiving communications associated with a synchronization signal block transmitted by a base station on a transmit beam. From the measured signal aspects, the user equipment (UE) may determine that a receive beam from the plurality of receive beams is a preferred beam for receipt of communications from the base station transmitted on the transmit beam. With the determined preferred beam, the UE may initiate a beam-sweeping procedure to re-measure the plurality of UE receive beams, where the UE measures the current preferred UE receive beam before measuring other receive beams of the plurality of UE receive beams.

A method of wireless communication at a UE is described. The method may include measuring each of a set of UE receive beams for receiving communications associated with a synchronization signal block transmitted by a base station on a transmit beam, determining, based on the measurements of the set of UE receive beams, that a first UE receive beam of the set of UE receive beams is a preferred beam for receipt of communications from the base station transmitted on the transmit beam, initiating a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams, and reporting the measurement of the first measurement opportunity to the base station.

An apparatus for wireless communication at a UE is described. The apparatus may include a processor, memory coupled with the processor, and instructions stored in the memory. The instructions may be executable by the processor to cause the apparatus to measure each of a set of UE receive beams for receiving communications associated with a synchronization signal block transmitted by a base station on a transmit beam, determine, based on the measurements of the set of UE receive beams, that a first UE receive beam of the set of UE receive beams is a preferred beam for receipt of communications from the base station transmitted on the transmit beam, initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams, and report the measurement of the first measurement opportunity to the base station.

Another apparatus for wireless communication at a UE is described. The apparatus may include means for measuring each of a set of UE receive beams for receiving communications associated with a synchronization signal block transmitted by a base station on a transmit beam, determining, based on the measurements of the set of UE receive beams, that a first UE receive beam of the set of UE receive beams is a preferred beam for receipt of communications from the base station transmitted on the transmit beam, initiating a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams, and reporting the measurement of the first measurement opportunity to the base station.

A non-transitory computer-readable medium storing code for wireless communication at a UE is described. The code may include instructions executable by a processor to measure each of a set of UE receive beams for receiving communications associated with a synchronization signal block transmitted by a base station on a transmit beam, determine, based on the measurements of the set of UE receive beams, that a first UE receive beam of the set of UE receive beams is a preferred beam for receipt of communications from the base station transmitted on the transmit beam, initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams, and report the measurement of the first measurement opportunity to the base station.

Some examples of the method, apparatuses, and non-transitory computer-readable medium described herein may further include operations, features, means, or instructions for determining, after determining that the first UE receive beam is the preferred beam, that a second UE receive beam of the set of UE receive beams may be the preferred beam for receipt of communications from the base station transmitted on the transmit beam, initiating a second beam-sweeping procedure, after the first beam-sweeping procedure, to re-measure the set of UE receive beams for receiving communications associated with the synchronization signal block, where the second beam-sweeping procedure includes measuring the second UE receive beam during a second measurement opportunity before measuring others of the set of UE receive beams, and reporting the measurement of the second measurement opportunity to the base station.

Some examples of the method, apparatuses, and non-transitory computer-readable medium described herein may further include operations, features, means, or instructions for determining, based on the measurement of the second measurement opportunity, that the second UE receive beam may be still the preferred beam for receipt of communications from the base station transmitted on the transmit beam, continuing the second beam-sweeping procedure during additional measurement opportunities by measuring the others of the set of UE receive beams, and reporting the measurements of the additional measurement opportunities to the base station.

In some examples of the method, apparatuses, and non-transitory computer-readable medium described herein, continuing the second beam-sweeping procedure may include operations, features, means, or instructions for measuring each of the others of the set of UE receive beams in an order based on indices of the set of UE receive beams.

In some examples of the method, apparatuses, and non-transitory computer-readable medium described herein, continuing the second beam-sweeping procedure may include operations, features, means, or instructions for measuring each of the others of the set of UE receive beams in a random order.

Some examples of the method, apparatuses, and non-transitory computer-readable medium described herein may further include operations, features, means, or instructions for updating a measurement database at the UE with the measurement of the second measurement opportunity and with the measurements of the additional measurement opportunities.

Some examples of the method, apparatuses, and non-transitory computer-readable medium described herein may further include operations, features, means, or instructions for determining, based on the measurement of the first measurement opportunity, that the first UE receive beam may be still the preferred beam for receipt of communications from the base station transmitted on the transmit beam, continuing the first beam-sweeping procedure during additional measurement opportunities by measuring the others of the set of UE receive beams, and reporting the measurements of the additional measurement opportunities to the base station.

In some examples of the method, apparatuses, and non-transitory computer-readable medium described herein, continuing the first beam-sweeping procedure may include operations, features, means, or instructions for measuring each of the others of the set of UE receive beams in an order based on indices of the set of UE receive beams.

In some examples of the method, apparatuses, and non-transitory computer-readable medium described herein, continuing the first beam-sweeping procedure may include operations, features, means, or instructions for measuring each of the others of the set of UE receive beams in a random order.

Some examples of the method, apparatuses, and non-transitory computer-readable medium described herein may further include operations, features, means, or instructions for updating a measurement database at the UE with the measurement of the first measurement opportunity and with the measurements of the additional measurement opportunities.

Some examples of the method, apparatuses, and non-transitory computer-readable medium described herein may further include operations, features, means, or instructions for determining, based on the measurement of the first measurement opportunity, whether the first UE receive beam may be still the preferred beam for receipt of communications from the base station transmitted on the transmit beam, where the determining may be based on a comparison of the measurement of the first measurement opportunity with a threshold.

In some examples of the method, apparatuses, and non-transitory computer-readable medium described herein, the measurement and the threshold may be one of a reference signal received power (RSRP), a signal to interference and noise ratio (SINR), or a Reference Signal Received Quality (RSRQ) for the synchronization signal block based on a primary synchronization signal, a secondary synchronization signal, or a physical broadcast channel of the synchronization signal block.

In some examples of the method, apparatuses, and non-transitory computer-readable medium described herein, the wireless communication occurs over a millimeter wave network.

DETAILED DESCRIPTION

Figure 1:
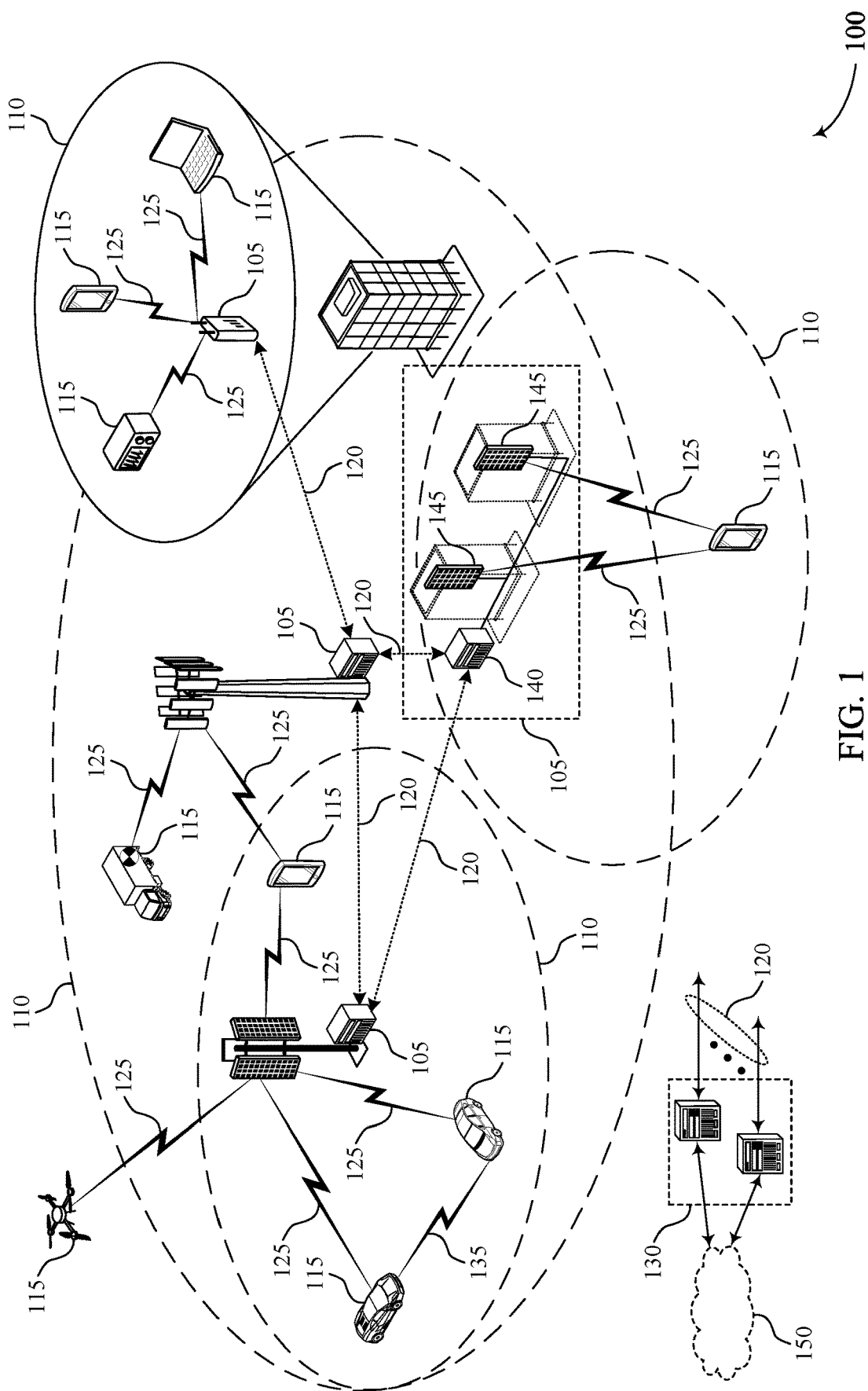
FIG. 1 illustrates an example of a system for wireless communications at a user equipment (UE) that supports virtual serving beam tracking in millimeter wave wireless systems in accordance with aspects of the present disclosure.

A user equipment (UE) and base station may be configured for beamformed transmissions. The base station may periodically transmit synchronization signals, which the UE may monitor for and measure when connecting to a cell. The synchronization signals may be transmitted in a synchronization signal block (SSB). An SSB may be transmitted in an SSB burst, where each SSB of the burst is associated with a different beam. An SSB may include, for example, a primary synchronization signal (PSS), a secondary synchronization signal (SSS), and a physical broadcast channel (PBCH).

The UE may perform a search procedure to detect new cells. As part of the search procedure, the UE may measure reference signals in the PSS and SSS of an SSB to receive accurate timing and synchronization information for the cell. Based on the measurements associated with a given SSB, the UE may be able to determine a preferred transmit/receive beam pair and connect to the base station using the preferred transmit/receive beam pair. Once connected with the cell, the UE may track the status and quality of its established beams.

However, in tracking the status and quality of its established beams, the UE may sweep over all the UE's receive beams one at a time in a predetermined order. In the example, the UE may periodically sweep through its receive beams with respect to each SSB in order to assess the strength of each measured reference signal on each receive beam. The measured information may be reported to the base station, and may be used by the base station to determine if a different transmit beam should be used. Additionally, the measured information may be used by the UE to determine whether the same or different receive beams should be used.

In some instances, the UE may sweep through its receive beams in a predetermined order, where the order has no relationship with the measured strength of the reference signals on each receive beam. In one example, the beam sweeping procedure may start at an initial beam index (for example, beam index 0) and then sequentially progress through the beam indices. This means that if a UE's preferred receive beam had been a higher index, for example (e.g., an index not near index 0), then the beam sweeping process may take a significant amount of time to finally measure a signal on the preferred beam. While this delay in measuring the preferred beam may have no consequence if the UE is not moving, the delay could result in inefficiencies if an update to the preferred beam is to occur due to, for example, mobility or changing channel conditions. In other words, if the UE is moving and would benefit from use of a different receive beam in its communications with the base station, a beam sweeping procedure that resulted in a delay in measurements of the current or preferred beam would result in a corresponding delay in the UE changing its preferred receive beam.

Therefore, a UE may use a beam-sweeping procedure where, once a preferred receive beam has been identified, a subsequent beam-sweep to re-measure the UE receive beams involves measuring the preferred receive beam first before measuring any of the other beams of the plurality of receive beams. In addition, if upon a subsequent beam-sweep the UE determines that the preferred receive beam is no longer the ideal beam to utilize, the UE may then assign another receive beam of the plurality of receive beams to be the preferred receive beam. Then, instead of continuing the beam sweep through the other receive beams, the UE may (at a following measurement opportunity) initiate a new beam sweep procedure, starting with the new preferred receive beam before measuring any of the other beams of the plurality of receive beams. In other words, in each instance that a preferred beam changes, a subsequent beam-sweep will begin at the newly designated preferred beam. If the preferred beam has not changed, then a subsequent beam-sweep will begin at the preferred beam and then sweep through measurements of the other associated receive beams.

Because the beam sweep procedure involves a measurement of one receive beam per measurement opportunity, and because the UE will evaluate whether a new preferred receive beam should be designated after each measurement opportunity, a beam sweep procedure may span over multiple measurement opportunities. However, when a preferred beam is newly identified, the UE will use a next measurement opportunity to initiate a new beam sweep procedure, starting at the newly identified preferred receive beam. When a preferred beam is determined to not change, subsequent measurement opportunities may be used to continue an existing beam sweep procedure, with other receive beams being measured.

Aspects of the disclosure are initially described in the context of wireless communications systems. Aspects of the disclosure are further illustrated by and described with reference to apparatus diagrams, system diagrams, and flowcharts that relate to virtual serving beam tracking in millimeter wave wireless systems.

FIG. 1 illustrates an example of a wireless communications system 100 that supports virtual serving beam tracking in millimeter wave wireless systems in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some aspects, a UE 115 may measure signal aspects for a plurality of respective receive beams for receiving communications associated with a synchronization signal block transmitted by a base station on a transmit beam. From the measured signal aspects, UE 115 may determine that a receive beam from the plurality of receive beams is a preferred beam (e.g., a virtual serving beam) for receipt of communications from the base station transmitted on the transmit beam. With the determined preferred beam, UE 115 may initiate a beam-sweeping procedure to re-measure the plurality of UE receive beams, where UE 115 measures the first UE receive beam before measuring other receive beams of the plurality of UE receive beams.

Figure 2:
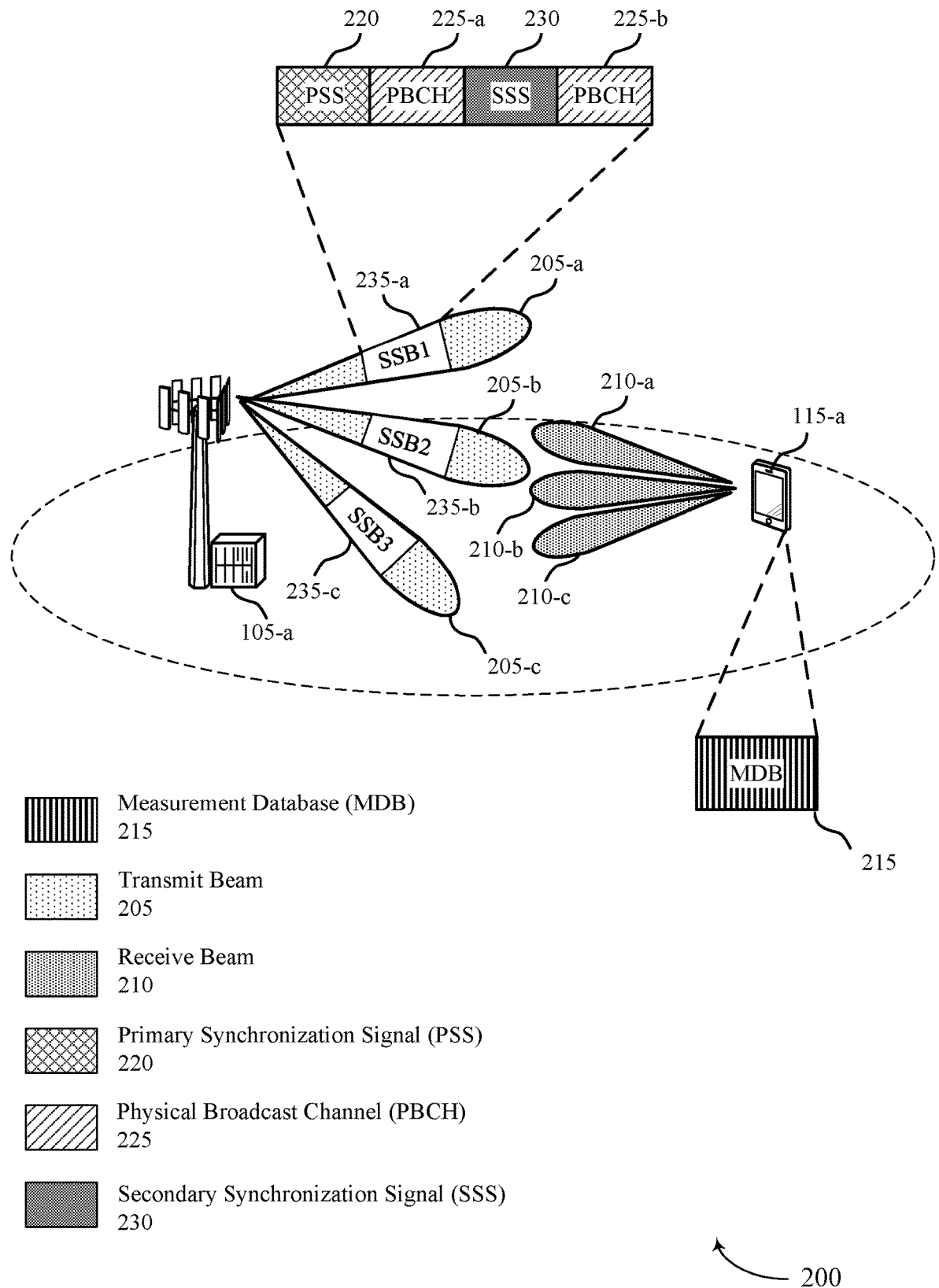
FIG. 2 illustrates an example of a wireless communication system that supports virtual serving beam tracking in millimeter wave wireless systems in accordance with aspects of the present disclosure.

FIG. 2 illustrates an example of a wireless communication system 200 that supports virtual serving beam tracking in millimeter wave wireless systems in accordance with aspects of the present disclosure. In some examples, wireless communication system 200 may implement aspects of wireless communication system 100. Wireless communications system 200 may include UE 115 a and base station 105a, which may be respective examples of a UE 115 and a base station 105 described with reference to FIG. 1.

Base station 105 a may periodically transmit SSBs 235, with each SSB associated with a particular transmit beam 205 of base station 105-a. For example, a first SSB 235-a (SSB1) may be associated with a first transmit beam 205-a, a second SSB 235-b (SSB2) may be associated with a second transmit beam 205-b, and a third SSB 235-c (SSB3) may be associated with a third transmit beam 205-c. Although three transmit beams associated with base station 105-a are shown, base station 105-a may have more or less transmit beams.

SSB 235 may include a primary synchronization signal (PSS) 220, a secondary synchronization signal (SSS) 230, and one or more physical broadcast channels (PBCH) 225. UE 115 a may measure reference signals in the PSS 220 and/or the SSS 230 to receive accurate timing and synchronization information for a cell associated with a particular SSB. UE 115 a may select from a plurality of UE receive beams, for example, receive beam 210-a, receive beam 210-b, and receive beam 210-c, to receive communications from base station 105-a for a particular cell. Although three receive beams associated with UE 115-a are shown, UE 115-a may have more or less receive beams.

UE 115-a may also determine a reference signal received power (RSRP), a signal to interference and noise ratio (SINR), and/or a Reference Signal Received Quality (RSRQ) for one or more receive beams 210 associated with a particular SSB 235. From one or more of these measurements associated with a particular SSB 235, UE 115-a may determine a preferred beam from the plurality of receive beams 210 for receiving communications transmitted on a transmit beam 205 associated with the SSB. For example, for SSB2 235-b, UE 115-a may measure one or more of a RSRP, SINR, or a RSRQ for each receive beam 210. From the measurements, UE 115-*a* may determine that receive beam 210-*c* is the preferred beam to receive communications via transmit beam 205-*b*, which is the transmit beam associated with SSB2 235-*b*.

After a receive beam has been designated as a preferred beam, UE 115-*a* may perform a beam-sweeping procedure at regular intervals to re-measure parameters for each receive beam in connection with the associated SSB. In some examples, only one receive beam is measured per interval. However, once a preferred beam has been established, UE 115-*a* may begin a beam-sweeping procedure with the preferred beam over the other receive beams. In the example provided above, because UE 115-*a* has designated receive beam 210-*c* as the preferred beam in connection with SSB2 235-*b*, UE 115-*a* will perform the beam-sweeping procedure with receive beam 210-*c* first before receive beam 210-*a* and receive beam 210-*b*. In other words, in each instance that a preferred beam changes, a subsequent beam-sweep will begin at the newly designated preferred beam. UE 115-*a* may measure receive beam 210-*a* and receive beam 210-*b* in order based on indices assigned to each of the receive beams. Additionally, UE 115-*a* may measure receive beam 210-*a* and receive beam 210-*b* in a random order. Upon performing the beam-sweeping procedure, UE 115-*a* may report the measurement results to base station 105-*a*. In some examples, UE 115-*a* may store and update a measurement database 215 with the measurements resulting from the beam-sweeping procedure.

Upon initiating a beam-sweeping procedure with receive beam 210-*c* as the preferred beam, UE 115-*a* may compare one or more resulting measured parameters associated with the preferred beam against a threshold. The parameters and the threshold may be based on one or more of RSRP, SINR, or a RSRQ. After the comparison against the threshold, UE 115-*a* may determine that receive beam 210-*c* should continue to be the preferred beam in connection with SSB2 235-*b*. If the preferred beam has not changed, then the beam sweeping procedure may continue (in subsequent intervals). In this case, UE 115-*a* may continue the beam-sweeping procedure to measure receive beam 210-*a* and receive beam 210-*b*.

In another example, upon a subsequent beam-sweeping procedure, UE 115-*a* may compare one or more resulting measured parameters associated with the preferred beam against the threshold. After the comparison against the threshold, UE 115-*a* may determine that receive beam 210-*c* should no longer be the preferred beam. Upon this determination, UE 115-*a* may then designate another receive beam apart from receive beam 210-*c* to be the preferred beam. In this example, UE 115-*a* may determine based on the subsequent beam-sweeping procedure that receive beam 210-*a* is the new preferred beam to receive communications via transmit beam 205-*b*, which is the transmit beam associated with SSB2 235-*b*. Because UE 115-*a* has designated receive beam 210-*a* as the preferred beam in connection with SSB2 235-*b*, UE 115-*a* will not continue its current beam sweeping procedure, but will instead, at a later sweep interval, initiate another beam-sweeping procedure with receive beam 210-*a* first before receive beam 210-*b* and receive beam 210-*c*. After measuring receive beam 210-*a* first, the UE 115-*a* may determine that the preferred receive beam should not further change, and then the UE 115-*a* will continue to measure the other receive beams 210-*b*, 210-*c*. UE 115-*a* may measure receive beam 210-*b* and receive beam 210-*c* in order based on indices assigned to each of the receive beams. Additionally, UE 115-*a* may measure receive beam 210-*b* and receive beam 210-*c* in a random order. Upon performing the beam-sweeping procedure, UE 115-*a* may report the measurement results to base station 105-*a*. In some examples, UE 115-*a* may store and update a measurement database 215 with the measurements resulting from the beam-sweeping procedure.

Upon performing a beam-sweeping procedure with receive beam 210-*a* as the preferred beam, UE 115-*a* may compare one or more resulting measured parameters associated with the preferred beam against a threshold. The parameters and the threshold may be based on one or more of RSRP, SINR, or a RSRQ. After the comparison against the threshold, UE 115-*a* may determine that receive beam 210-*a* should continue to be the preferred beam in connection with SSB2 235-*b*. In this case, UE 115-*a* may continue the beam-sweeping procedure (over subsequent intervals) to measure receive beam 210-*b* and receive beam 210-*c*.

Figure 3:
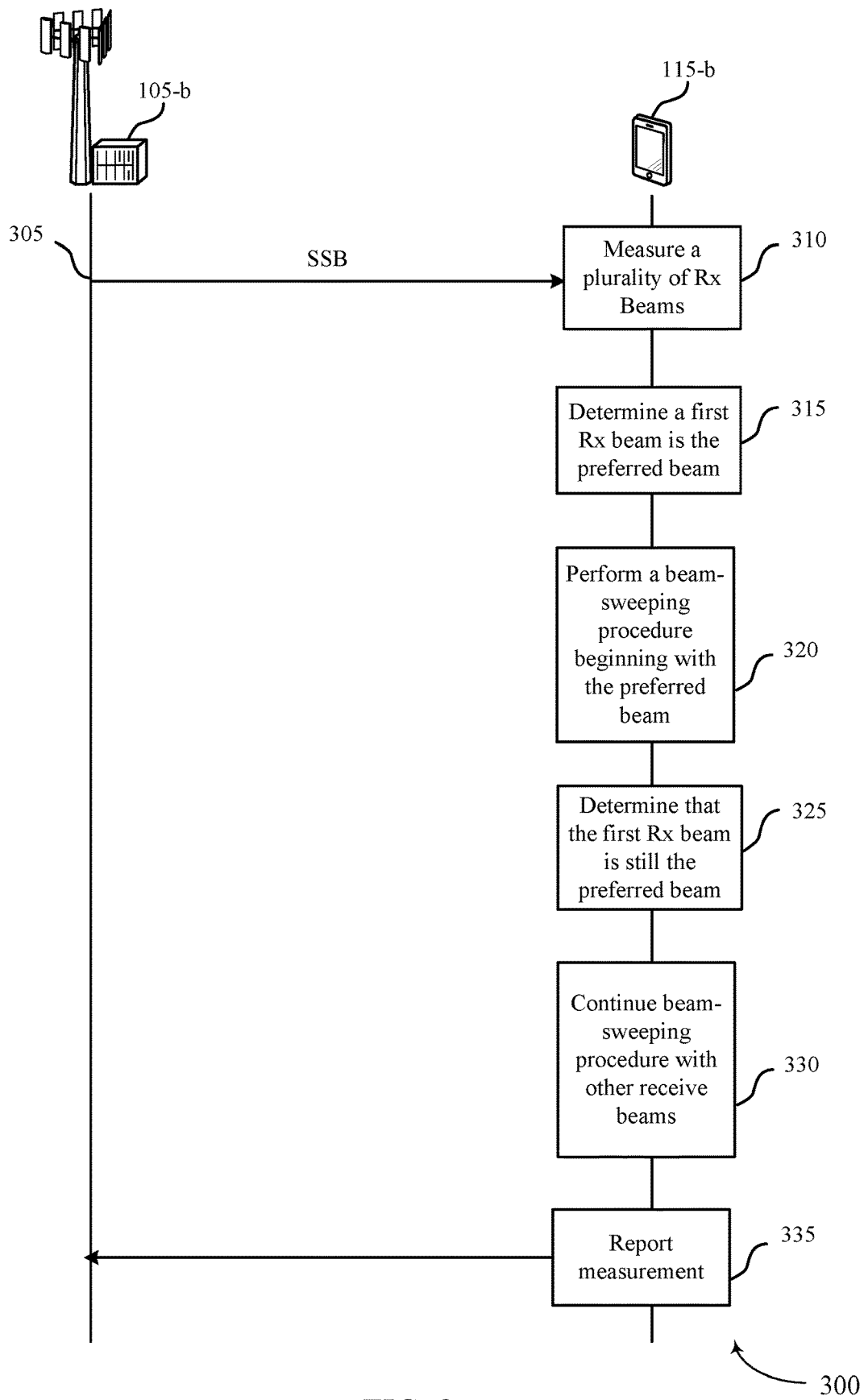
FIG. 3 illustrates an example of a process flow that supports virtual serving beam tracking in millimeter wave wireless systems in accordance with aspects of the present disclosure.

FIG. 3 illustrates an example of a process flow 300 that supports virtual serving beam tracking in millimeter wave wireless systems in accordance with aspects of the present disclosure. In some examples, process flow 300 may implement aspects of wireless communication system 100. Process flow 300 may include UE 115-*b* and base station 105-*b*, which may be respective examples of a UE 115 and a base station 105 described with reference to FIGS. 1 and 2.

At 305, base station 105-*b* may transmit one or more reference signals in an SSB to UE 115-*b*. In some cases, the SSB may include a PSS, an SSS, and PBCH signals. The SSB may be associated with a particular transmit beam of base station 105-*b*.

At 310, UE 115-*b* may measure reference signals in the PSS, the PBCH, and/or the SSS to receive accurate timing and synchronization information for a cell associated with a particular SSB. UE 115-*b* may also determine a RSRP, a SINR, and/or a RSRQ for one or more receive beams associated with a particular SSB.

At 315, from one or more of these measurements associated with a particular SSB, UE 115-*b* may determine a preferred beam from a plurality of associated receive beams for receiving communications transmitted on a transmit beam associated with the SSB.

At 320, UE 115-*b* may perform a beam-sweeping procedure at regular intervals to re-measure parameters for each receive beam in connection with the associated SSB. In some examples, only one receive beam is measured per interval. Once a preferred beam has been established, UE 115-*b* may begin a beam-sweeping procedure with the preferred beam over the other receive beams. In other words, in each instance that a preferred beam changes, the beam sweeping procedure does not continue during subsequent intervals, but instead a subsequent beam-sweep will begin at the newly designated preferred beam. Once the preferred beam is determined to not change (as measured during a first interval of a beam sweep procedure), the UE 115-*b* may continue the beam sweep procedure by measuring other receive beams during subsequent intervals. In some examples, UE 115-*b* may measure the other receive beams in order based on indices assigned to each of the receive beams. In other examples, UE 115-*b* may measure the other receive beams in a random order. In some examples, UE 115-*b* may store and update a measurement database with the measurements resulting from the beam-sweeping procedure.

At 325, upon performing a beam-sweeping procedure with the preferred beam, UE 115-*b* may compare one or more resulting measured parameters associated with the preferred beam against a threshold. The parameters and the threshold may be based on one or more of RSRP, SINR, or a RSRQ. After the comparison against the threshold, UE 115-*b* may determine that the preferred beam should continue to be the preferred beam in connection with the SSB. If the preferred beam has not changed, then a subsequent beam-sweep will begin at the preferred beam and then sweep through measurements of the other associated receive beams.

At 330, UE **115-*b* may continue the beam-sweeping procedure to measure the other receive beams associated with UE 115-*b*. In some examples, only one receive beam is measured per interval. At 335, UE 115-*b* may report the measurement results to base station 105-*b***.

Figure 4:
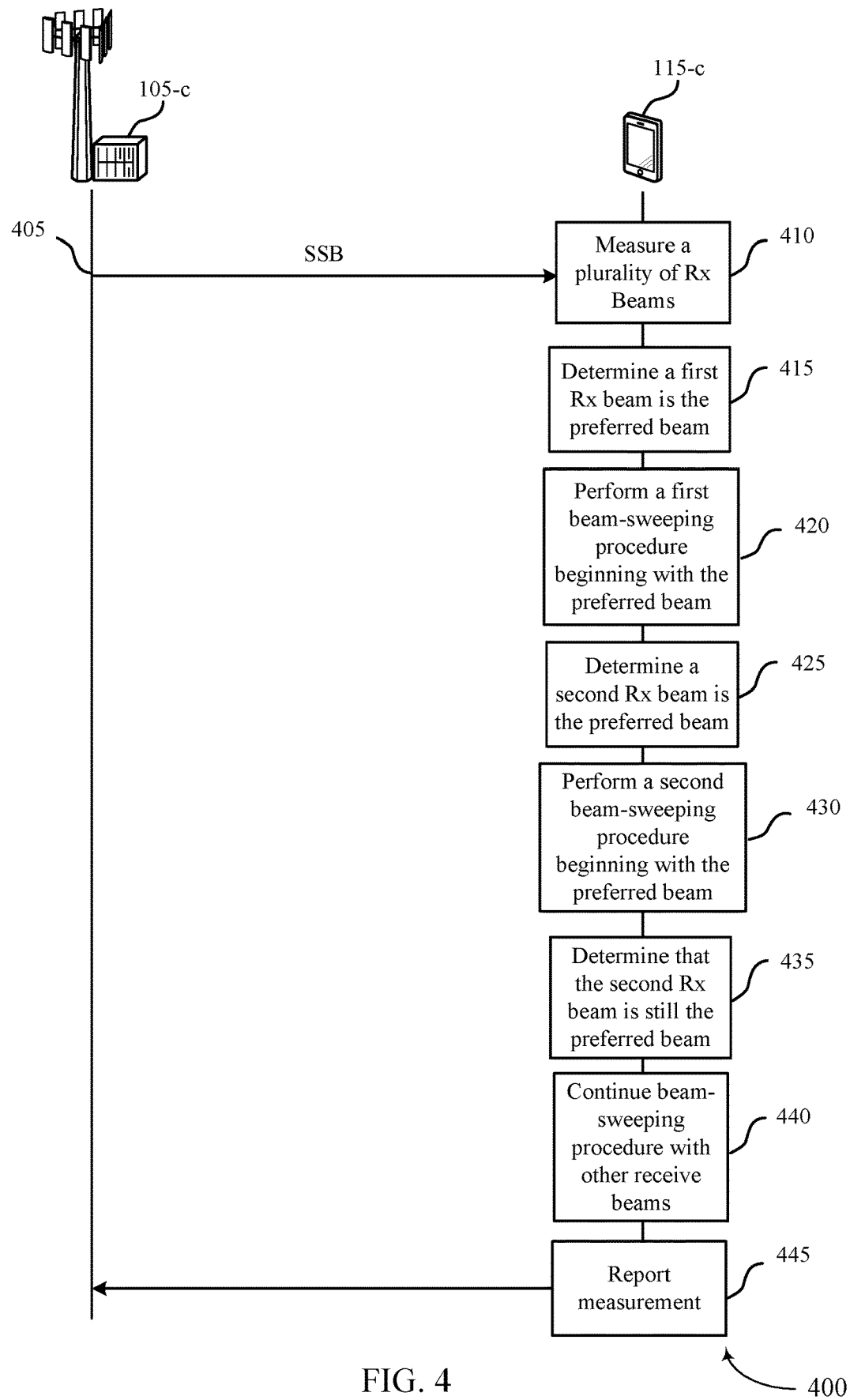
FIG. 4 illustrates an example of a process flow that supports virtual serving beam tracking in millimeter wave wireless systems in accordance with aspects of the present disclosure.

FIG. 4 illustrates an example of a process flow 400 that supports virtual serving beam tracking in millimeter wave wireless systems in accordance with aspects of the present disclosure. In some examples, process flow 400 may implement aspects of wireless communication system 100. Process flow 300 may include UE **115-*c* and base station 105-*c*, which may be respective examples of a UE 115 and a base station 105 described with reference to FIGS. 1 and 2**.

At 405, base station **105-*c* may transmit an SSB to UE 115-*c*. In some cases, the SSB may include a PSS, an SSS, and PBCH signals. The SSB may be associated with a particular transmit beam of base station 105-*c***.

At 410, UE **115-*c* may measure reference signals in the PSS, the PBCH, and/or the SSS to receive accurate timing and synchronization information for a cell associated with a particular SSB. UE 115-*c*** may also determine a RSRP, a SINR, and/or a RSRQ for one or more receive beams associated with a particular SSB.

At 415, from one or more of these measurements associated with a particular SSB, UE **115-*c*** may determine that a first receive beam should be the preferred beam from a plurality of associated receive beams for receiving communications transmitted on a transmit beam associated with the SSB.

At 420, UE **115-*c* may perform a beam-sweeping procedure at regular intervals to re-measure parameters for each receive beam in connection with the associated SSB. In some examples, only one receive beam is measured per interval. Once a preferred beam has been established, UE 115-*c*** may begin a beam-sweeping procedure with the preferred beam over the other receive beams. In other words, in each instance that a preferred beam changes, a subsequent beam-sweep will begin at the newly designated preferred beam.

At 425, upon performing a beam-sweeping procedure with the preferred beam, UE **115-*c* may compare one or more resulting measured parameters associated with the preferred beam against a threshold. The parameters and the threshold may be based on one or more of RSRP, SINR, or a RSRQ. After the comparison against the threshold, UE 115-*c* may determine that the preferred beam should not continue to be the preferred beam in connection with the SSB. Upon this determination, UE 115-*c*** may then designate a second associated receive beam apart from the first receive beam to be the preferred beam.

At 430, UE **115-*c* may perform a beam-sweeping procedure at regular intervals to re-measure parameters for each receive beam in connection with the associated SSB. In some examples, only one receive beam is measured per interval. Since a new preferred beam has been established, UE 115-*c* may begin a beam-sweeping procedure with the new preferred beam over the other receive beams. Each time that a new receive beam is identified, the beam sweeping procedure does not continue but instead is reinitiated again (during a subsequent interval) at the new preferred beam. When the preferred beam is identified as not changing, the beam sweep procedure may continue (during subsequent intervals) by measuring other receive beams. In some examples, UE 115-*c* may measure the other receive beams in order based on indices assigned to each of the receive beams. In other examples, UE 115-*c* may measure the other receive beams in a random order. In some examples, UE 115-*c*** may store and update a measurement database with the measurements resulting from the beam-sweeping procedure.

At 435, upon performing a beam-sweeping procedure with the new preferred beam, UE **115-*c* may compare one or more resulting measured parameters associated with the preferred beam against a threshold. The parameters and the threshold may be based on one or more of RSRP, SINR, or a RSRQ. After the comparison against the threshold, UE 115-*c*** may determine that the new preferred beam should continue to be the preferred beam in connection with the SSB. If the preferred beam has not changed, then a subsequent beam-sweep will begin at the preferred beam and then sweep through measurements of the other associated receive beams.

At 440, UE **115-*c* may continue the beam-sweeping procedure to measure the other receive beams associated with UE 115-*c*, with only one receive beam being measured per interval. At 445, UE 115-*c* may report the measurement results to base station 105-*c***.

Figure 5:
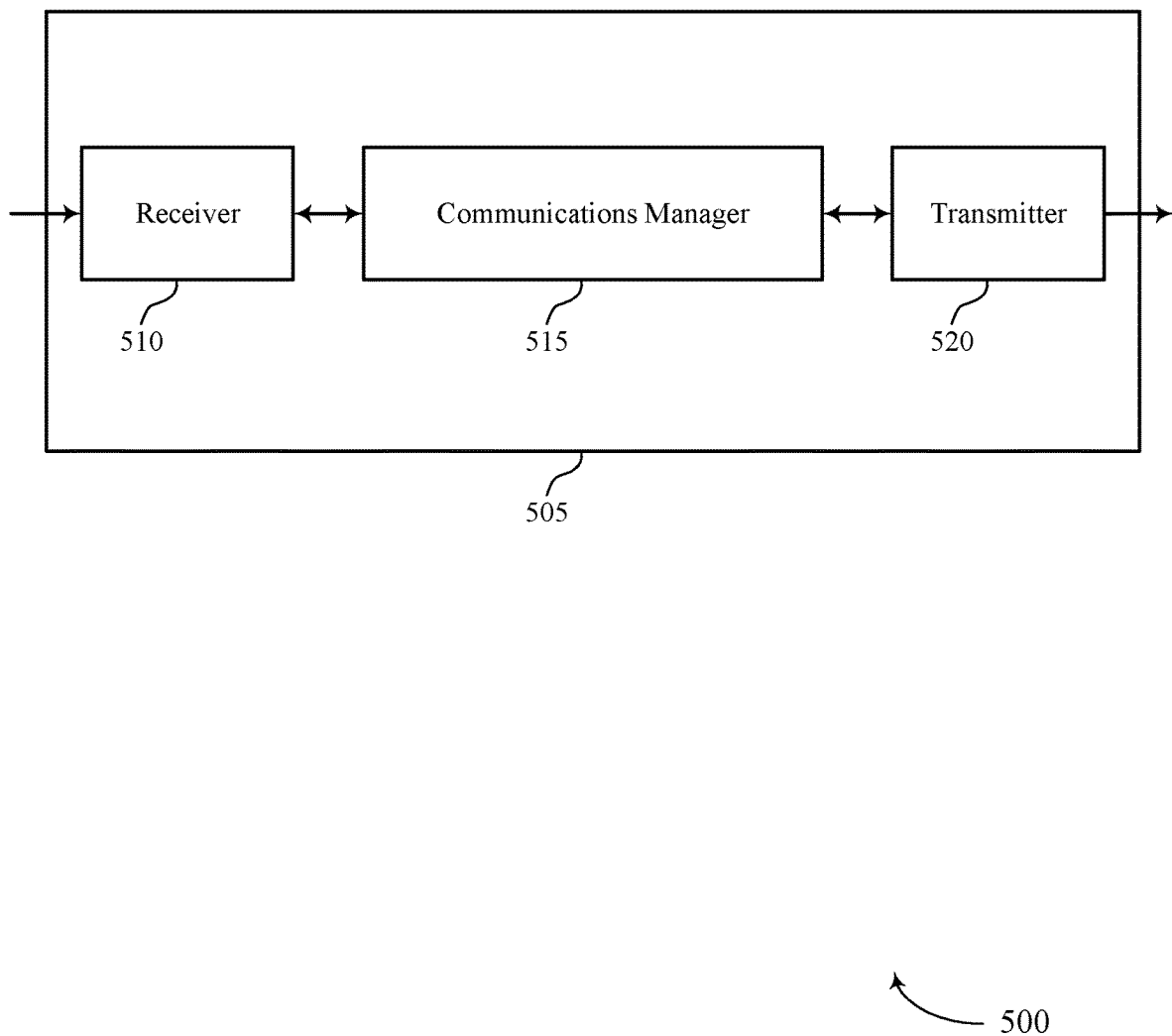
FIGS. 5 and 6 show block diagrams of devices that support virtual serving beam tracking in millimeter wave wireless systems in accordance with aspects of the present disclosure.

FIG. 5 shows a block diagram 500 of a device 505 that supports virtual serving beam tracking in millimeter wave wireless systems in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The communications manager 515 may measure each of a set of UE receive beams for receiving communications associated with a synchronization signal block transmitted by a base station on a transmit beam, initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams, determine, based on the measurements of the set of UE receive beams, that a first UE receive beam of the set of UE receive beams is a preferred beam for receipt of communications from the base station transmitted on the transmit beam, and report the measurement of the first measurement opportunity to the base station. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 6:
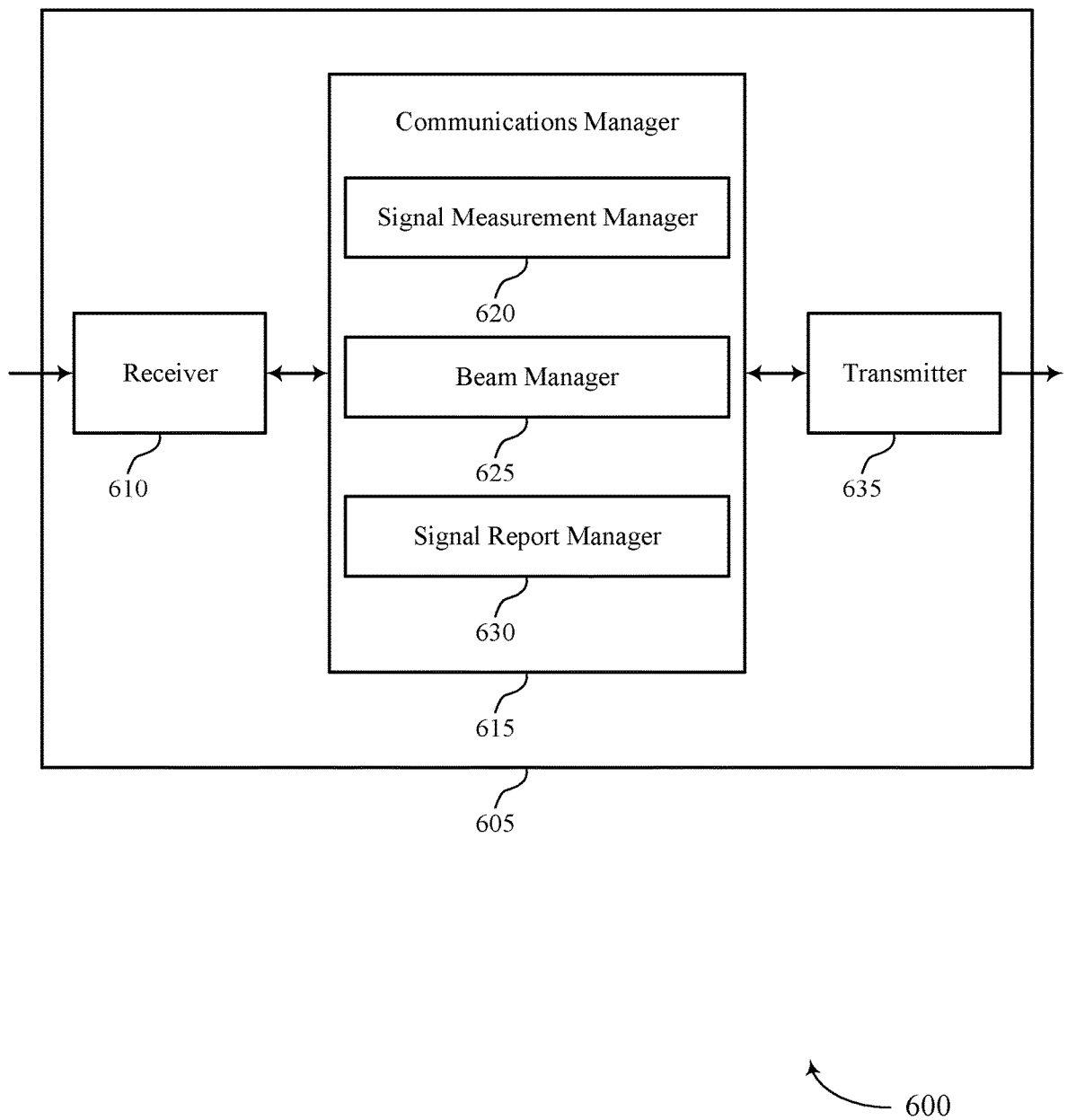

FIG. 6 shows a block diagram 600 of a device 605 that supports virtual serving beam tracking in millimeter wave wireless systems in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The communications manager 615 may be an example of aspects of the communications manager 515 as described herein. The communications manager 615 may include a signal measurement manager 620, a beam manager 625, and a signal report manager 630. The communications manager 615 may be an example of aspects of the communications manager 810 described herein.

The actions performed by communications manager 615 as described herein may be implemented to realize one or more potential advantages. One implementation may allow a UE 115 to report beam or radio link failures more effectively to a base station 105. Another implementation may provide a better user experience at the UE 115 as beam or radio link failures are managed in a more efficient manner.

The signal measurement manager 620 may measure each of a set of UE receive beams for receiving communications associated with a synchronization signal block transmitted by a base station on a transmit beam and initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams.

The beam manager 625 may determine, based on the measurements of the set of UE receive beams, that a first UE receive beam of the set of UE receive beams is a preferred beam for receipt of communications from the base station transmitted on the transmit beam.

The signal report manager 630 may report the measurement of the first measurement opportunity to the base station.

Figure 7:
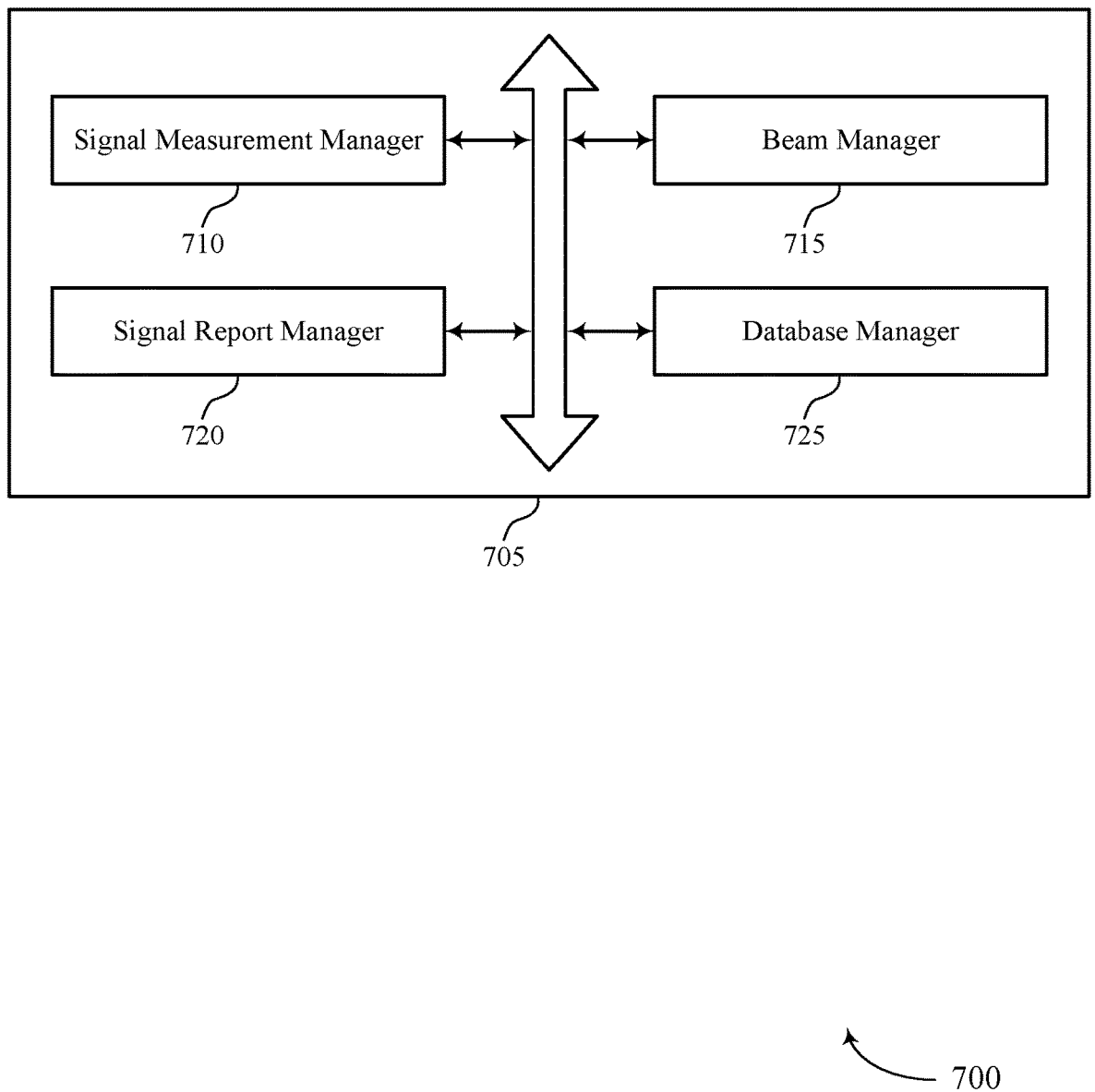
FIG. 7 shows a block diagram of a communications manager that supports virtual serving beam tracking in millimeter wave wireless systems in accordance with aspects of the present disclosure.

FIG. 7 shows a block diagram 700 of a communications manager 705 that supports virtual serving beam tracking in millimeter wave wireless systems in accordance with aspects of the present disclosure. The communications manager 705 may be an example of aspects of a communications manager 515, a communications manager 615, or a communications manager 810 described herein. The communications manager 705 may include a signal measurement manager 710, a beam manager 715, a signal report manager 720, and a database manager 725. Each of these modules may communicate, directly or indirectly, with one another (e.g., via one or more buses).

The signal measurement manager 710 may measure each of a set of UE receive beams for receiving communications associated with a synchronization signal block transmitted by a base station on a transmit beam.

In some examples, the signal measurement manager 710 may initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams.

In some examples, the signal measurement manager 710 may initiate a second beam-sweeping procedure, after the first beam-sweeping procedure, to re-measure the set of UE receive beams for receiving communications associated with the synchronization signal block, where the second beam-sweeping procedure includes measuring the second UE receive beam during a second measurement opportunity before measuring others of the set of UE receive beams.

In some examples, the signal measurement manager 710 may continue a beam-sweeping procedure during additional measurement opportunities by measuring the others of the set of UE receive beams.

The beam manager 715 may determine, based on the measurements of the set of UE receive beams, that a first UE receive beam of the set of UE receive beams is a preferred beam for receipt of communications from the base station transmitted on the transmit beam.

In some examples, the beam manager 715 may determine, after determining that the first UE receive beam is the preferred beam, that a second UE receive beam of the set of UE receive beams is the preferred beam for receipt of communications from the base station transmitted on the transmit beam.

In some examples, the beam manager 715 may determine, based on the measurement of the second measurement opportunity, that the second UE receive beam is still the preferred beam for receipt of communications from the base station transmitted on the transmit beam.

In some examples, the beam manager 715 may measure each of the others of the set of UE receive beams in an order based on indices of the set of UE receive beams.

In some examples, the beam manager 715 may measure each of the others of the set of UE receive beams in a random order.

In some examples, the beam manager 715 may determine, based on the measurement of the first measurement opportunity, that the first UE receive beam is still the preferred beam for receipt of communications from the base station transmitted on the transmit beam.

In some examples, the beam manager 715 may determine, based on the measurement of the first measurement opportunity, whether the first UE receive beam is still the preferred beam for receipt of communications from the base station transmitted on the transmit beam, where the determining is based on a comparison of the measurement of the first measurement opportunity with a threshold.

In some examples, the signal report manager 720 may report the measurements of the measurement opportunities to the base station.

The database manager 725 may update a measurement database at the UE with the measurement of a measurement opportunity and with the measurements of the additional measurement opportunities.

Figure 8:
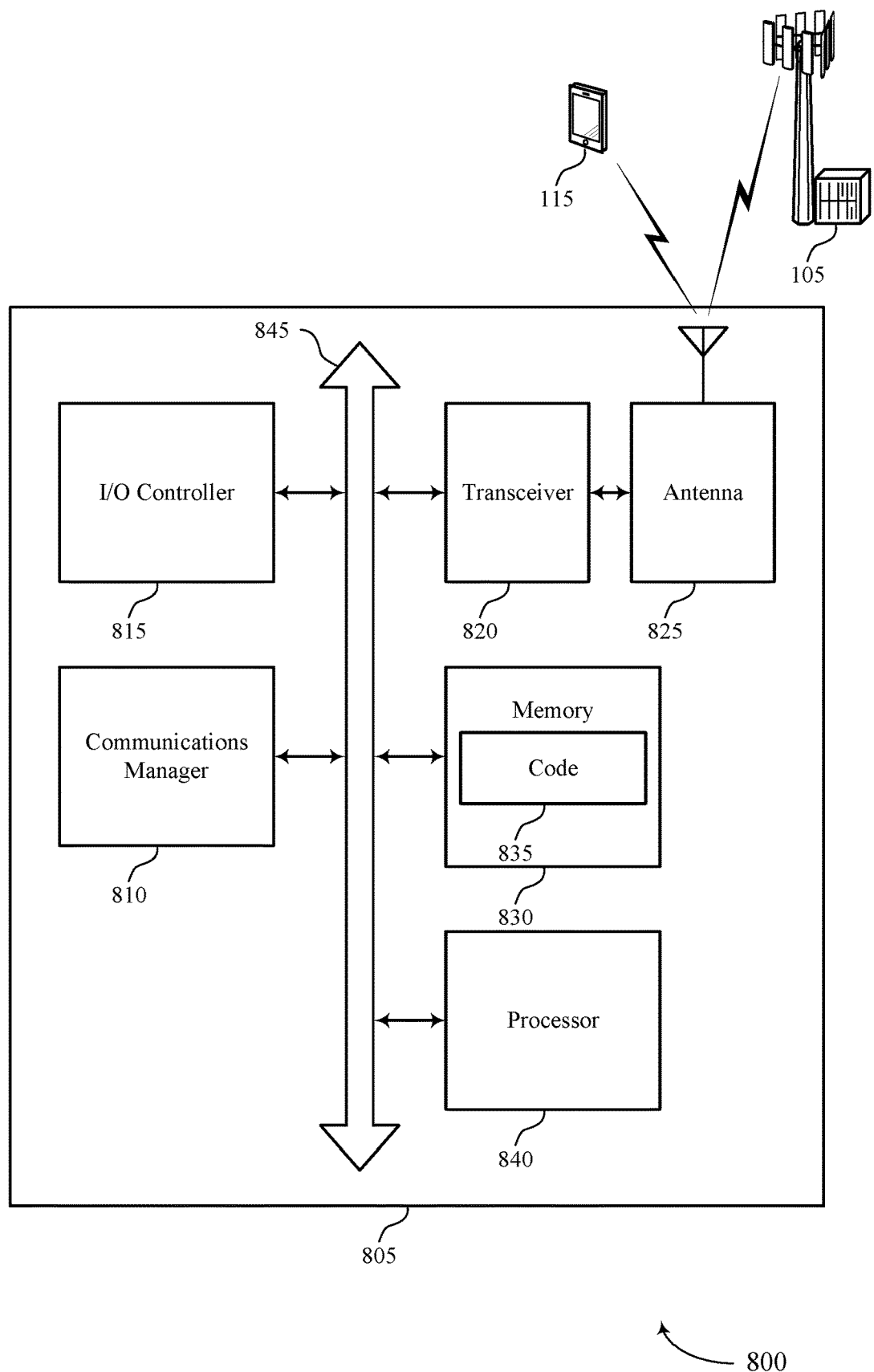
FIG. 8 shows a diagram of a system including a device that supports virtual serving beam tracking in millimeter wave wireless systems in accordance with aspects of the present disclosure.

FIG. 8 shows a diagram of a system 800 including a device 805 that supports virtual serving beam tracking in millimeter wave wireless systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may measure each of a set of UE receive beams for receiving communications associated with a synchronization signal block transmitted by a base station on a transmit beam, initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams, determine, based on the measurements of the set of UE receive beams, that a first UE receive beam of the set of UE receive beams is a preferred beam for receipt of communications from the base station transmitted on the transmit beam, and report the measurement of the first measurement opportunity to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink shared channel successive leakage cancellation).

Based on identifying a preferred receiver beam, processor 840 of UE 115 may efficiently process subsequent measurements of other UE receive beams. As such, procedures at processor 840 may run more efficiently through the reduction of delayed measurement updates concerning deficient receiver beams.

The code 835 may include instructions to implement aspects of the present disclosure, including instructions to support wireless communications at a user equipment (UE). The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
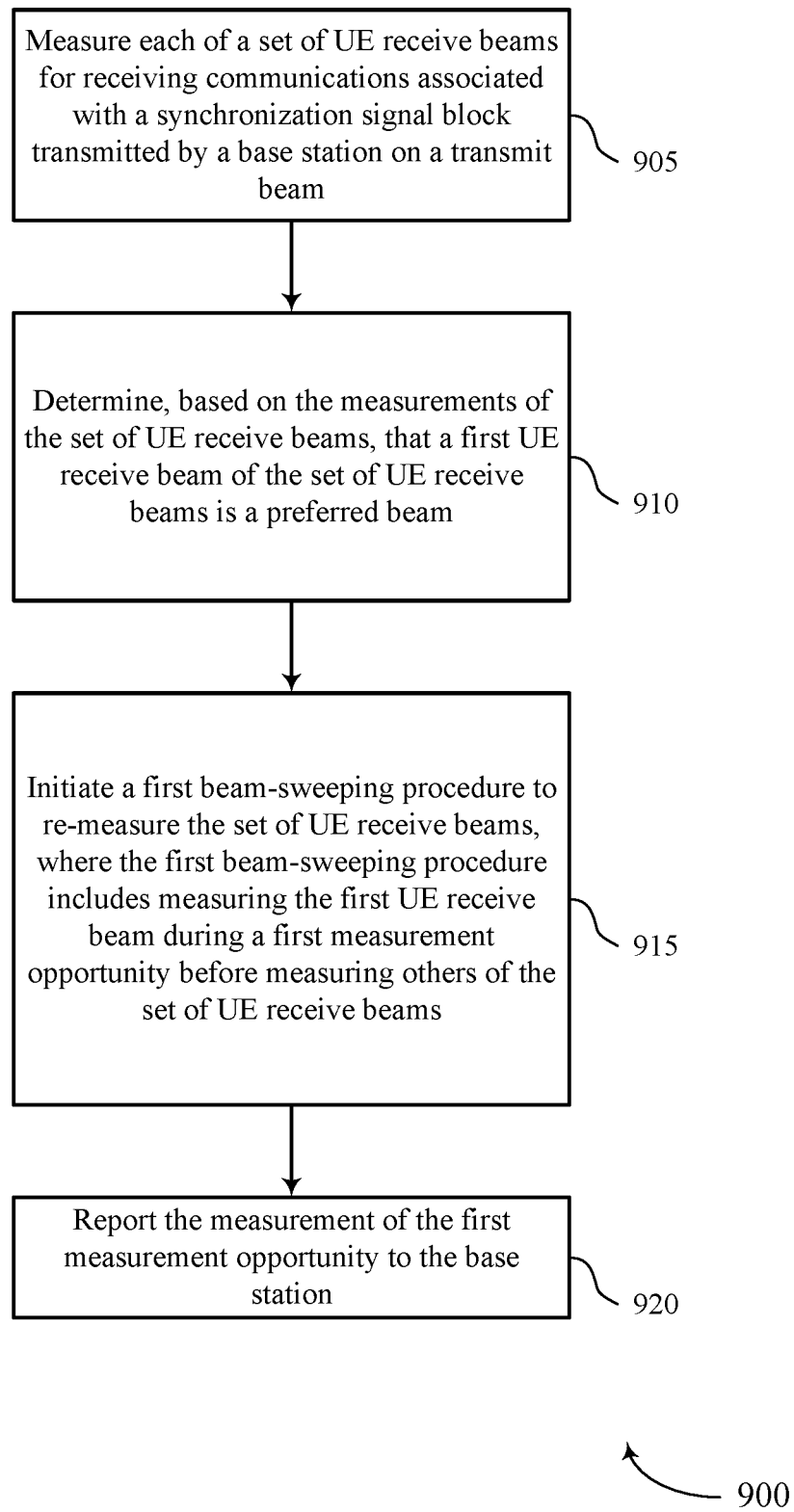
FIGS. 9 through 11 show flowcharts illustrating methods that support virtual serving beam tracking in millimeter wave wireless systems in accordance with aspects of the present disclosure.

FIG. 9 shows a flowchart illustrating a method 900 that supports virtual serving beam tracking in millimeter wave wireless systems in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may measure each of a set of UE receive beams for receiving communications associated with a synchronization signal block transmitted by a base station on a transmit beam. The operations of 905 may be performed according to the methods described herein. In some examples, aspects of the operations of 905 may be performed by a signal measurement manager as described with reference to FIGS. 5 through 8.

At 910, the UE may determine, based on the measurements of the set of UE receive beams, that a first UE receive beam of the set of UE receive beams is a preferred beam for receipt of communications from the base station transmitted on the transmit beam. The operations of 910 may be performed according to the methods described herein. In some examples, aspects of the operations of 910 may be performed by a beam manager as described with reference to FIGS. 5 through 8.

At 915, the UE may initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams. The operations of 915 may be performed according to the methods described herein. In some examples, aspects of the operations of 915 may be performed by a signal measurement manager as described with reference to FIGS. 5 through 8.

At 920, the UE may report the measurement of the first measurement opportunity to the base station. The operations of 920 may be performed according to the methods described herein. In some examples, aspects of the operations of 920 may be performed by a signal report manager as described with reference to FIGS. 5 through 8.

Figure 10:
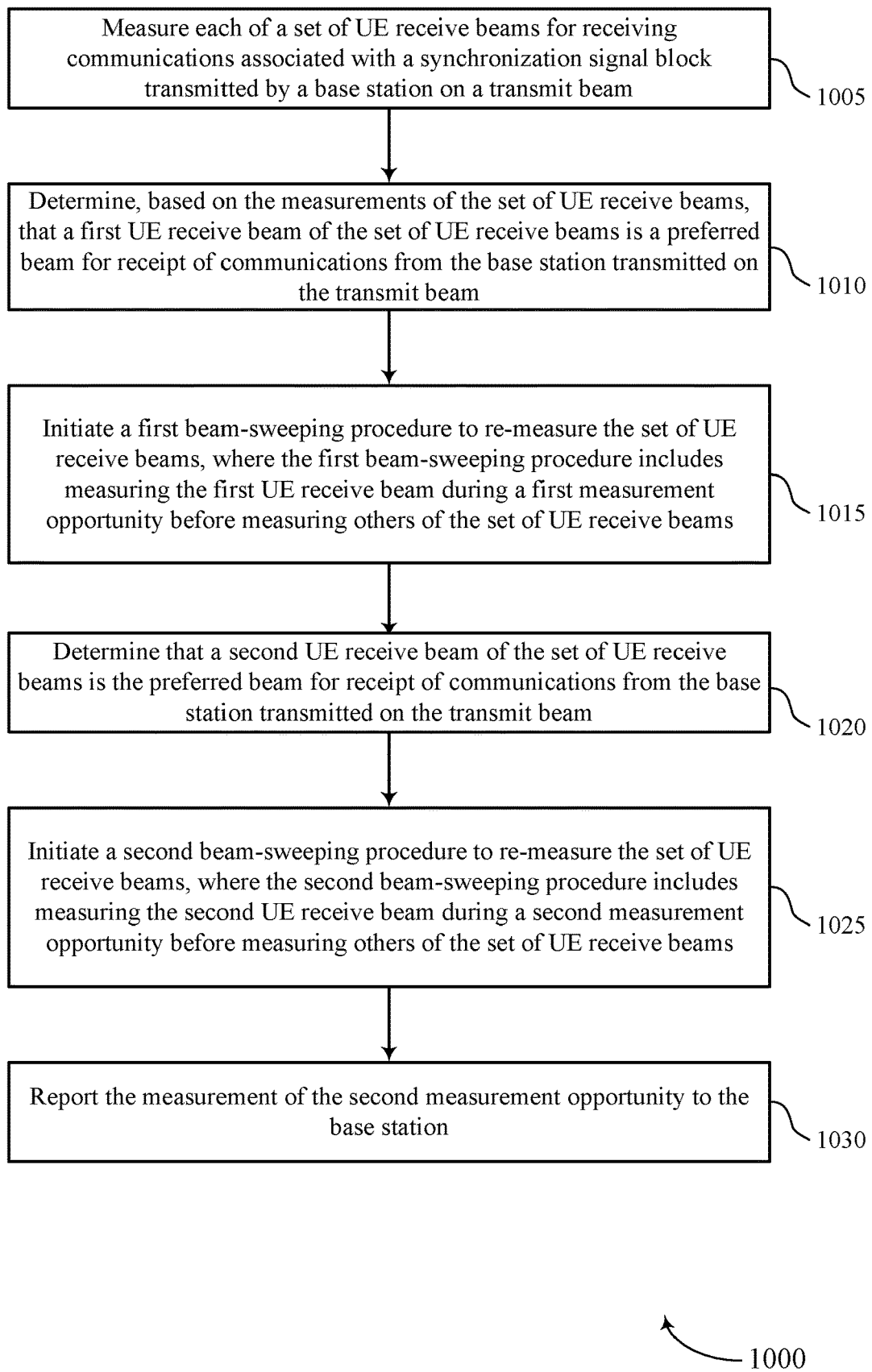

FIG. 10 shows a flowchart illustrating a method 1000 that supports virtual serving beam tracking in millimeter wave wireless systems in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may measure each of a set of UE receive beams for receiving communications associated with a synchronization signal block transmitted by a base station on a transmit beam. The operations of 1005 may be performed according to the methods described herein. In some examples, aspects of the operations of 1005 may be performed by a signal measurement manager as described with reference to FIGS. 5 through 8.

At 1010, the UE may determine, based on the measurements of the set of UE receive beams, that a first UE receive beam of the set of UE receive beams is a preferred beam for receipt of communications from the base station transmitted on the transmit beam. The operations of 1010 may be performed according to the methods described herein. In some examples, aspects of the operations of 1010 may be performed by a beam manager as described with reference to FIGS. 5 through 8.

At 1015, the UE may initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams. The operations of 1015 may be performed according to the methods described herein. In some examples, aspects of the operations of 1015 may be performed by a signal measurement manager as described with reference to FIGS. 5 through 8.

At 1020, the UE may determine, after determining that the first UE receive beam is the preferred beam, that a second UE receive beam of the set of UE receive beams is the preferred beam for receipt of communications from the base station transmitted on the transmit beam. The operations of 1020 may be performed according to the methods described herein. In some examples, aspects of the operations of 1020 may be performed by a beam manager as described with reference to FIGS. 5 through 8.

At 1025, the UE may initiate a second beam-sweeping procedure, after the first beam-sweeping procedure, to re-measure the set of UE receive beams for receiving communications associated with the synchronization signal block, where the second beam-sweeping procedure includes measuring the second UE receive beam during a second measurement opportunity before measuring others of the set of UE receive beams. The operations of 1025 may be performed according to the methods described herein. In some examples, aspects of the operations of 1025 may be performed by a signal measurement manager as described with reference to FIGS. 5 through 8.

At 1030, the UE may report the measurement of the second measurement opportunity to the base station. The operations of 1030 may be performed according to the methods described herein. In some examples, aspects of the operations of 1030 may be performed by a signal report manager as described with reference to FIGS. 5 through 8.

Figure 11:
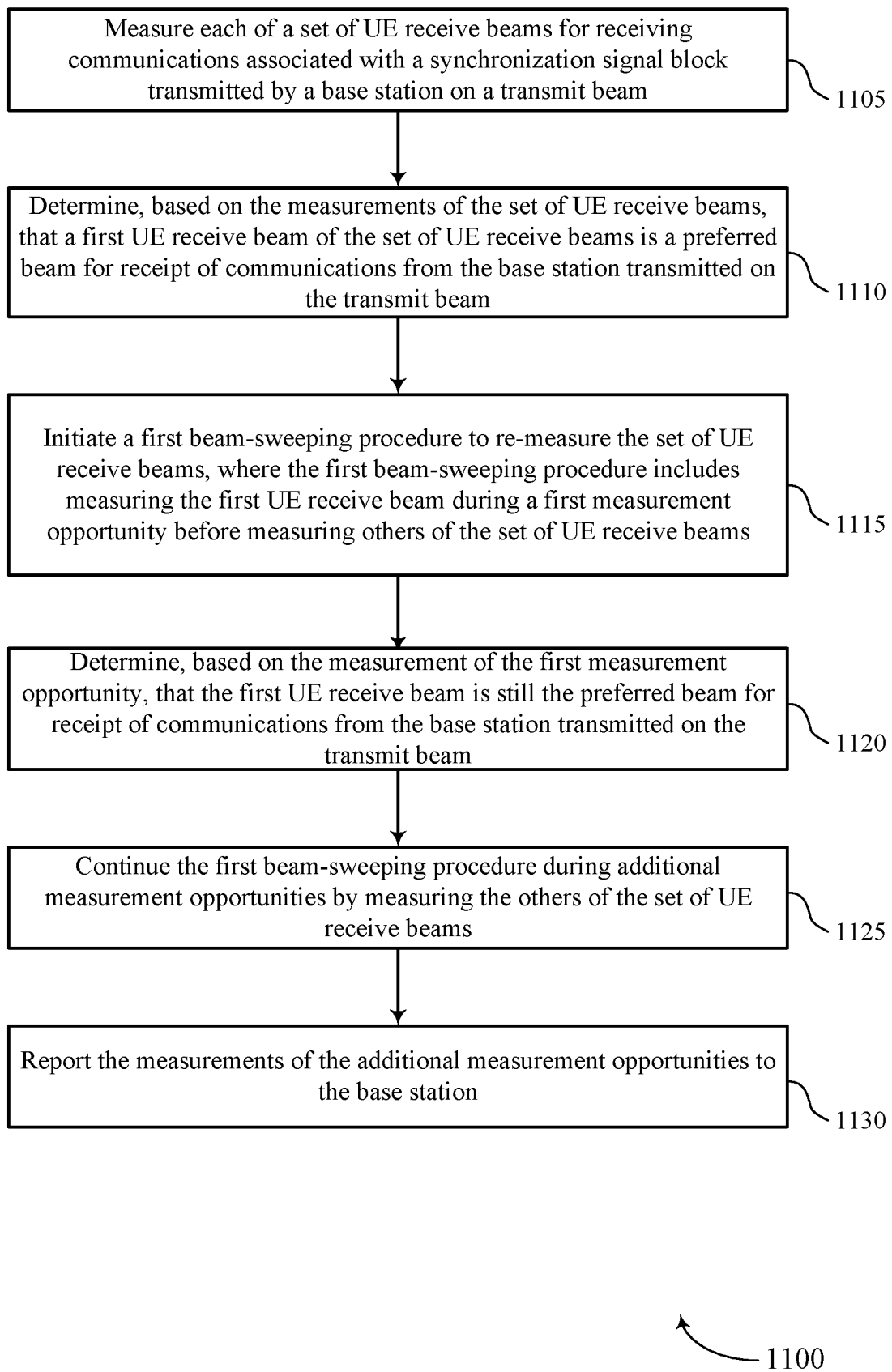

FIG. 11 shows a flowchart illustrating a method 1100 that supports virtual serving beam tracking in millimeter wave wireless systems in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may measure each of a set of UE receive beams for receiving communications associated with a synchronization signal block transmitted by a base station on a transmit beam. The operations of 1105 may be performed according to the methods described herein. In some examples, aspects of the operations of 1105 may be performed by a signal measurement manager as described with reference to FIGS. 5 through 8.

At 1110, the UE may determine, based on the measurements of the set of UE receive beams, that a first UE receive beam of the set of UE receive beams is a preferred beam for receipt of communications from the base station transmitted on the transmit beam.

The operations of 1110 may be performed according to the methods described herein. In some examples, aspects of the operations of 1110 may be performed by a beam manager as described with reference to FIGS. 5 through 8.

At 1115, the UE may initiate a first beam-sweeping procedure to re-measure the set of UE receive beams for receiving communications associated with the synchronization signal block, where the first beam-sweeping procedure includes measuring the first UE receive beam during a first measurement opportunity before measuring others of the set of UE receive beams. The operations of 1115 may be performed according to the methods described herein. In some examples, aspects of the operations of 1115 may be performed by a signal measurement manager as described with reference to FIGS. 5 through 8.

At 1120, the UE may determine, based on the measurement of the first measurement opportunity, that the first UE receive beam is still the preferred beam for receipt of communications from the base station transmitted on the transmit beam. The operations of 1120 may be performed according to the methods described herein. In some examples, aspects of the operations of 1120 may be performed by a beam manager as described with reference to FIGS. 5 through 8.

At 1125, the UE may continue the first beam-sweeping procedure during additional measurement opportunities by measuring the others of the set of UE receive beams. In some examples, only one receive beam is measured per measurement opportunity. The operations of 1125 may be performed according to the methods described herein. In some examples, aspects of the operations of 1125 may be performed by a signal measurement manager as described with reference to FIGS. 5 through 8.

At 1130, the UE may report the measurements of the additional measurement opportunities to the base station. The operations of 1130 may be performed according to the methods described herein. In some examples, aspects of the operations of 1130 may be performed by a signal report manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   measuring each of a plurality of UE receive beams for receiving communications associated with a synchronization signal block transmitted by a base station on a transmit beam;
   determining, based at least in part on the measurements of the plurality of UE receive beams, that a first UE receive beam of the plurality of UE receive beams is a preferred beam for receipt of communications from the base station transmitted on the transmit beam;
   initiating a first beam-sweeping procedure, the first beam-sweeping procedure including measuring the first UE receive beam during a first measurement opportunity before measuring others of the plurality of UE receive beams, wherein the first beam-sweeping procedure re-measures at least a portion of the plurality of UE receive beams; and
   reporting a measurement of the first measurement opportunity to the base station.

2. The method of claim 1, further comprising:
   determining, after determining that the first UE receive beam is the preferred beam, that a second UE receive beam of the plurality of UE receive beams is the preferred beam for the receipt of the communications from the base station transmitted on the transmit beam;
   initiating a second beam-sweeping procedure, the second beam-sweeping procedure including measuring the second UE receive beam during a second measurement opportunity before measuring others of the plurality of UE receive beams, wherein the second beam-sweeping procedure re-measures at least a portion of the plurality of UE receive beams; and
   reporting a measurement of the second measurement opportunity to the base station.

3. The method of claim 2, further comprising:
   determining, based at least in part on the measurement of the second measurement opportunity, that the second UE receive beam is still the preferred beam for the receipt of the communications from the base station transmitted on the transmit beam;
   continuing the second beam-sweeping procedure during additional measurement opportunities by measuring the others of the plurality of UE receive beams; and
   reporting measurements of the additional measurement opportunities to the base station.

4. The method of claim 3, wherein continuing the second beam-sweeping procedure comprises:
   measuring each of the others of the plurality of UE receive beams in an order based at least in part on indices of the plurality of UE receive beams.

5. The method of claim 3, wherein continuing the second beam-sweeping procedure comprises:
   measuring each of the others of the plurality of UE receive beams in a random order.

6. The method of claim 3, further comprising:
   updating a measurement database at the UE with the measurement of the second measurement opportunity and with the measurements of the additional measurement opportunities.

7. The method of claim 1, further comprising:
   determining, based at least in part on the measurement of the first measurement opportunity, that the first UE receive beam is still the preferred beam for the receipt of the communications from the base station transmitted on the transmit beam;
   continuing the first beam-sweeping procedure during additional measurement opportunities by measuring the others of the plurality of UE receive beams; and
   reporting measurements of the additional measurement opportunities to the base station.

8. The method of claim 7, wherein continuing the first beam-sweeping procedure comprises:
   measuring each of the others of the plurality of UE receive beams in an order based at least in part on indices of the plurality of UE receive beams.

9. The method of claim 7, wherein continuing the first beam-sweeping procedure comprises:
   measuring each of the others of the plurality of UE receive beams in a random order.

10. The method of claim 7, further comprising:
    updating a measurement database at the UE with the measurement of the first measurement opportunity and with the measurements of the additional measurement opportunities.

11. The method of claim 1, further comprising:
    determining, based at least in part on the measurement of the first measurement opportunity, whether the first UE receive beam is still the preferred beam for the receipt of the communications from the base station transmitted on the transmit beam, wherein the determining whether the first UE receive beam is still the preferred beam is based at least in part on a comparison of the measurement of the first measurement opportunity with a threshold.

12. The method of claim 11, wherein the measurement of the first measurement opportunity and the threshold are one of a reference signal received power (RSRP), a signal to interference and noise ratio (SINK), or a Reference Signal Received Quality (RSRQ) for the synchronization signal block based at least in part on a primary synchronization signal, a secondary synchronization signal, or a physical broadcast channel of the synchronization signal block.

13. The method of claim 1, wherein the wireless communication occurs over a millimeter wave network.

14. An apparatus for wireless communication, comprising:
    a processor,
    memory coupled with the processor; and
    instructions stored in the memory and executable by the processor to cause the apparatus to:
      measure each of a plurality of user equipment (UE) receive beams for receiving communications associated with a synchronization signal block transmitted by a base station on a transmit beam;
      determine, based at least in part on the measurements of the plurality of UE receive beams, that a first UE receive beam of the plurality of UE receive beams is a preferred beam for receipt of communications from the base station transmitted on the transmit beam;
      initiate a first beam-sweeping procedure, the first beam-sweeping procedure including measuring the first UE receive beam during a first measurement opportunity before measuring others of the plurality of UE receive beams, wherein the first beam-sweeping procedure re-measures at least a portion of the plurality of UE receive beams; and
      report a measurement of the first measurement opportunity to the base station.

15. The apparatus of claim 14, wherein the instructions are further executable by the processor to cause the apparatus to:

determine, after determining that the first UE receive beam is the preferred beam, that a second UE receive beam of the plurality of UE receive beams is the preferred beam for the receipt of the communications from the base station transmitted on the transmit beam;

initiate a second beam-sweeping procedure, the second beam-sweeping procedure including measuring the second UE receive beam during a second measurement opportunity before measuring others of the plurality of UE receive beams, wherein the second beam-sweeping procedure re-measures at least a portion of the plurality of UE receive beams; and report a measurement of the second measurement opportunity to the base station.

16. The apparatus of claim 15, wherein the instructions are further executable by the processor to cause the apparatus to:

determine, based at least in part on the measurement of the second measurement opportunity, that the second UE receive beam is still the preferred beam for the receipt of the communications from the base station transmitted on the transmit beam;

continue the second beam-sweeping procedure during additional measurement opportunities by measuring the others of the plurality of UE receive beams; and report measurements of the additional measurement opportunities to the base station.

17. The apparatus of claim 16, wherein the instructions to continue the second beam-sweeping procedure are executable by the processor to cause the apparatus to:

measure each of the others of the plurality of UE receive beams in an order based at least in part on indices of the plurality of UE receive beams.

18. The apparatus of claim 16, wherein the instructions to continue the second beam-sweeping procedure are executable by the processor to cause the apparatus to:

measure each of the others of the plurality of UE receive beams in a random order.

19. The apparatus of claim 16, wherein the instructions are further executable by the processor to cause the apparatus to:

update a measurement database at the UE with the measurement of the second measurement opportunity and with the measurements of the additional measurement opportunities.

20. The apparatus of claim 14, wherein the instructions are further executable by the processor to cause the apparatus to:

determine, based at least in part on the measurement of the first measurement opportunity, that the first UE receive beam is still the preferred beam for the receipt of the communications from the base station transmitted on the transmit beam;

continue the first beam-sweeping procedure during additional measurement opportunities by measuring the others of the plurality of UE receive beams; and report measurements of the additional measurement opportunities to the base station.

21. The apparatus of claim 20, wherein the instructions to continue the first beam-sweeping procedure are executable by the processor to cause the apparatus to:

measure each of the others of the plurality of UE receive beams in an order based at least in part on indices of the plurality of UE receive beams.

22. The apparatus of claim 20, wherein the instructions to continue the first beam-sweeping procedure are executable by the processor to cause the apparatus to:

measure each of the others of the plurality of UE receive beams in a random order.

23. The apparatus of claim 20, wherein the instructions are further executable by the processor to cause the apparatus to:

update a measurement database at the UE with the measurement of the first measurement opportunity and with the measurements of the additional measurement opportunities.

24. The apparatus of claim 14, wherein the instructions are further executable by the processor to cause the apparatus to:

determine, based at least in part on the measurement of the first measurement opportunity, whether the first UE receive beam is still the preferred beam for the receipt of the communications from the base station transmitted on the transmit beam, wherein the determining whether the first UE receive beam is still the preferred beam is based at least in part on a comparison of the measurement of the first measurement opportunity with a threshold.

25. The apparatus of claim 24, wherein the measurement of the first measurement opportunity and the threshold are one of a reference signal received power (RSRP), a signal to interference and noise ratio (SINR), or a Reference Signal Received Quality (RSRQ) for the synchronization signal block based at least in part on a primary synchronization signal, a secondary synchronization signal, or a physical broadcast channel of the synchronization signal block.

26. The apparatus of claim 14, wherein the wireless communication occurs over a millimeter wave network.

27. An apparatus for wireless communication, comprising:

means for measuring each of a plurality of user equipment (UE) receive beams for receiving communications associated with a synchronization signal block transmitted by a base station on a transmit beam;

means for determining, based at least in part on the measurements of the plurality of UE receive beams, that a first UE receive beam of the plurality of UE receive beams is a preferred beam for receipt of communications from the base station transmitted on the transmit beam;

means for initiating a first beam-sweeping procedure, the first beam-sweeping procedure including measuring the first UE receive beam during a first measurement opportunity before measuring others of the plurality of UE receive beams, wherein the first beam-sweeping procedure re-measures at least a portion of the plurality of UE receive beams; and means for reporting the measurement of a first measurement opportunity to the base station.

28. The apparatus of claim 27, further comprising:

means for determining, after determining that the first UE receive beam is the preferred beam, that a second UE receive beam of the plurality of UE receive beams is the preferred beam for the receipt of the communications from the base station transmitted on the transmit beam;

means for initiating a second beam-sweeping procedure, after the first beam-sweeping procedure, to re-measure the plurality of UE receive beams for receiving the communications associated with the synchronization signal block, wherein the second beam-sweeping procedure includes measuring the second UE receive beam during a second measurement opportunity before measuring others of the plurality of UE receive beams; and means for reporting a measurement of the second measurement opportunity to the base station.

29. A non-transitory computer-readable medium storing code for wireless communication at a user equipment (UE), the code comprising instructions executable by a processor to:
- measure each of a plurality of UE receive beams for receiving communications associated with a synchronization signal block transmitted by a base station on a transmit beam;
- determine, based at least in part on the measurements of the plurality of UE receive beams, that a first UE receive beam of the plurality of UE receive beams is a preferred beam for receipt of communications from the base station transmitted on the transmit beam;
- initiate a first beam-sweeping procedure, the first beam-sweeping procedure including measuring the first UE receive beam during a first measurement opportunity before measuring others of the plurality of UE receive beams, wherein the first beam-sweeping procedure re-measures at least a portion of the plurality of UE receive beams; and
- report a measurement of the first measurement opportunity to the base station.

30. The non-transitory computer-readable medium of claim 29, wherein the instructions are further executable to:
- determine, after determining that the first UE receive beam is the preferred beam, that a second UE receive beam of the plurality of UE receive beams is the preferred beam for the receipt of the communications from the base station transmitted on the transmit beam;
- initiate a second beam-sweeping procedure, after the first beam-sweeping procedure, to re-measure the plurality of UE receive beams for receiving the communications associated with the synchronization signal block, wherein the second beam-sweeping procedure includes measuring the second UE receive beam during a second measurement opportunity before measuring others of the plurality of UE receive beams; and
- report a measurement of the second measurement opportunity to the base station.

* * * * *